United States Patent [19]

Epner

[11] Patent Number: 4,960,500
[45] Date of Patent: Oct. 2, 1990

[54] WASTE METAL EXTRACTION APPARATUS

[76] Inventor: Randolph L. Epner, 393 Valley Rd., Haworth, N.J. 07641

[21] Appl. No.: 389,048

[22] Filed: Aug. 2, 1989

Related U.S. Application Data

[63] Continuation-in-part of Ser. No. 230,596, Aug. 10, 1988, Pat. No. 4,863,580.

[51] Int. Cl.$^5$ .............................. C25C 7/00; C25C 7/06
[52] U.S. Cl. ................................... 204/269; 204/273; 204/275
[58] Field of Search ............... 204/269, 268, 273, 275, 204/276–278, 237

[56] References Cited

U.S. PATENT DOCUMENTS

| | | | |
|---|---|---|---|
| 3,415,732 | 12/1968 | Komjathy | 204/237 |
| 3,558,455 | 1/1971 | Sorensen et al. | 204/269 X |
| 3,679,556 | 7/1972 | Doevenspeck | 204/269 |
| 4,022,678 | 5/1977 | Wojcik et al. | 204/273 |
| 4,129,494 | 12/1978 | Norman | 204/269 X |
| 4,425,216 | 1/1984 | Neymeyer | 204/273 X |
| 4,643,819 | 2/1987 | Heroguelle | 204/269 |

*Primary Examiner*—Donald R. Valentine
*Attorney, Agent, or Firm*—Darby & Darby

[57] ABSTRACT

A waste metal extraction apparatus is disclosed which includes a tank (1) having a plurality of oppositely disposed arcuate baffles (14) disposed on the sidewalls. The baffles are placed in an offsetting relation in order to direct the flow of a fluid through the cell in essentially a serpentine fashion. The arcuate baffles facilitate maintaining a maximum velocity through the turning radius of the fluid passing therethrough to prevent a solids buildup. In addition, the tank is placed at an angle of at least 6 degrees downwardly sloped in the direction of flow. The tank bottom (6) includes a plurality of sockets (20) sized to engage a plurality of cathode supports (21) placed therein, with each support including a mating end (22) for mating with the socket. Each post includes a slot (23) extending substantially therethrough for accepting a cathode (13) therein. A conductive metal fork (31) is disposed over the post having legs (32) which extend the length of the cathode, providing uniform electrical properties across the surface of the cathode thereby providing for optimum, uniform metal removal. The tank further includes a sludge gate (36) at the outlet end thereof with the sludge gate provided for removing any solids which settle as the waste stream follows the serpentine path provided by the arcuate baffles, the sludge gate removing a concentrated solids-containing stream which may be filtered and recycled to the tank inlet. In another embodiment, the waste stream flows through flow control baffles, which provide individual flow control by each cathode, to maximize contact and metal removal. Utilizing the combination of flow modifying baffles, a sloped bottom and enhanced electrical contacting means provides for use of electrolytic cells for removing heavy metals from streams containing about 1–15% solids without requiring frequent down time for tank cleaning.

9 Claims, 5 Drawing Sheets

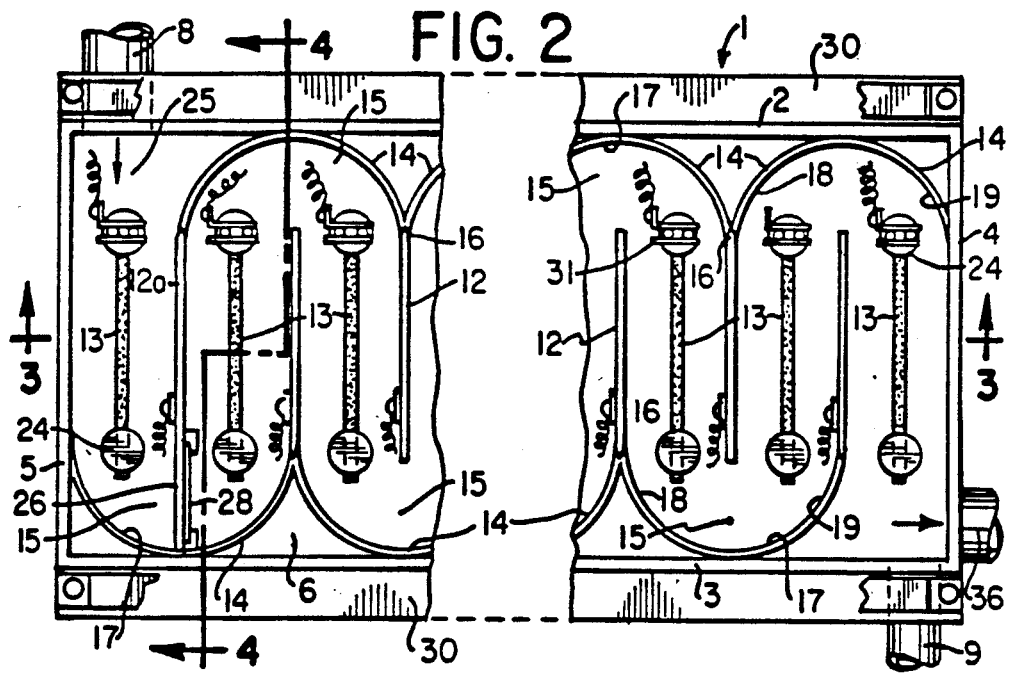
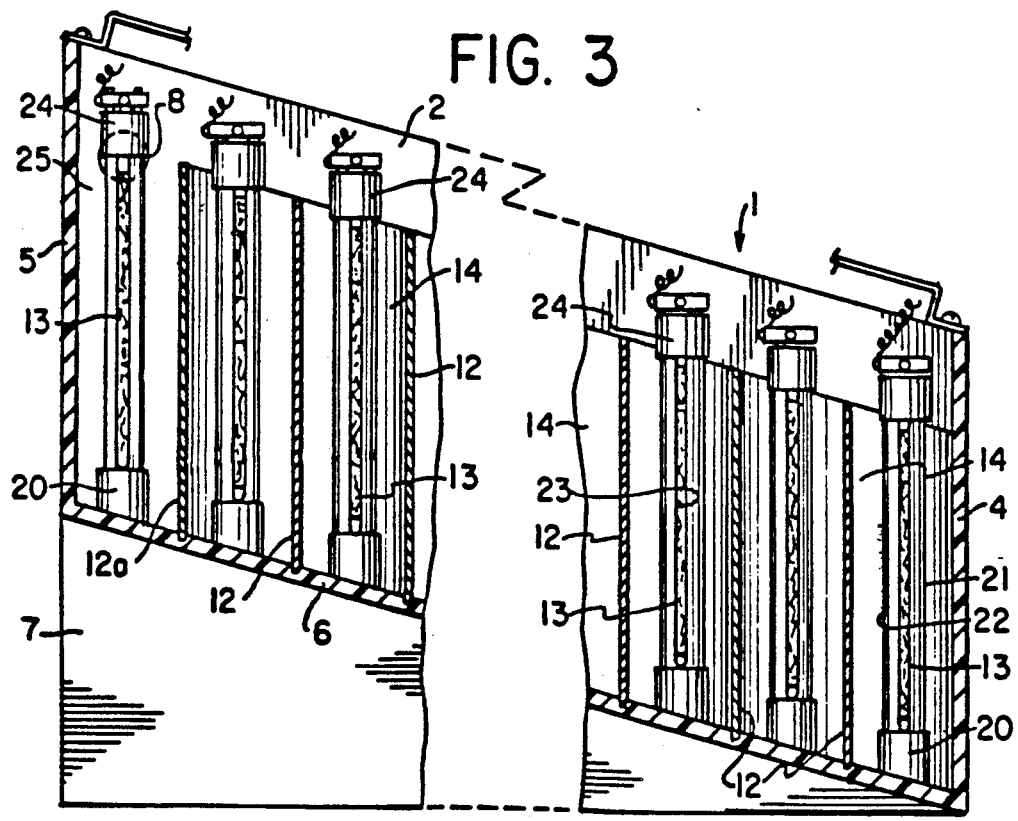

U.S. Patent  Oct. 2, 1990  Sheet 3 of 5  4,960,500
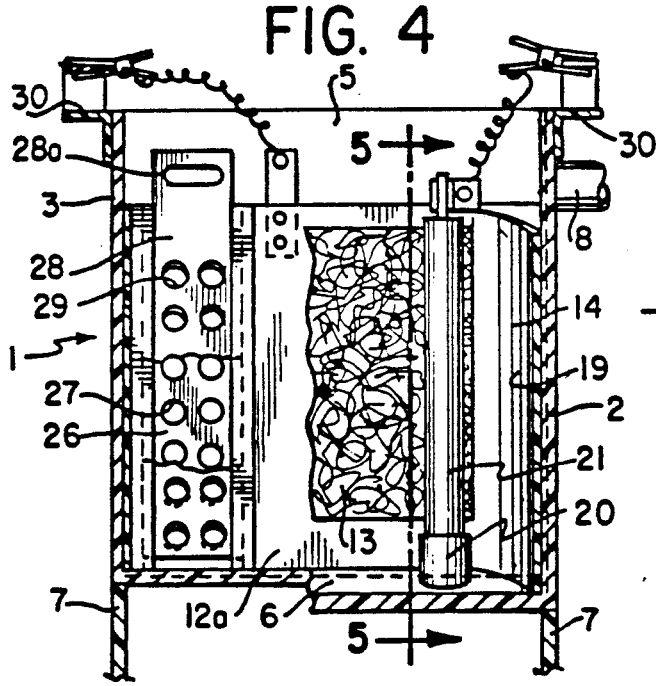
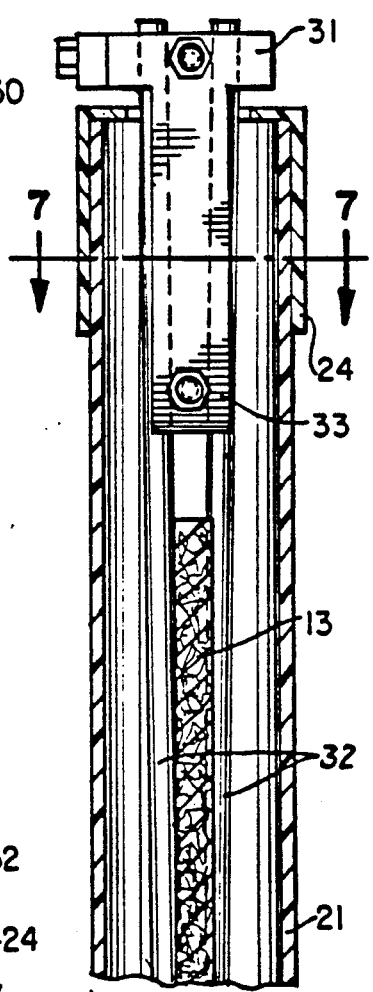
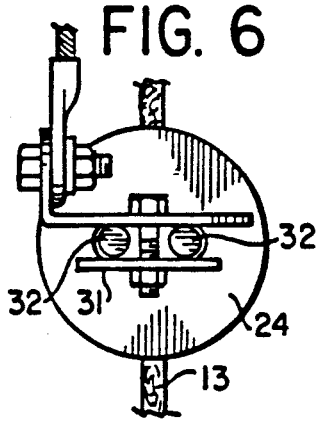
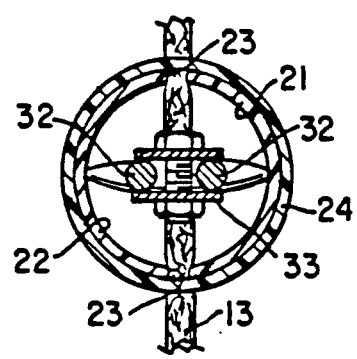
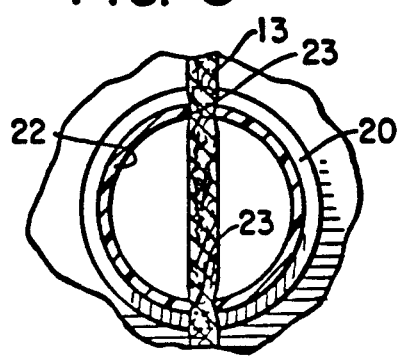
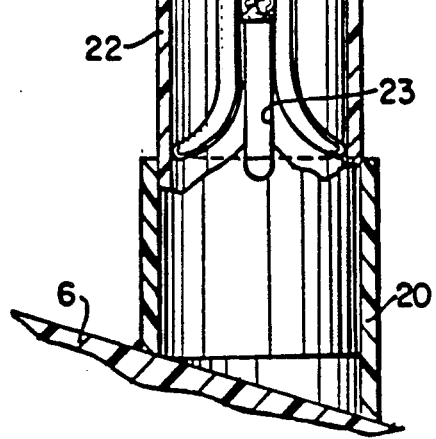

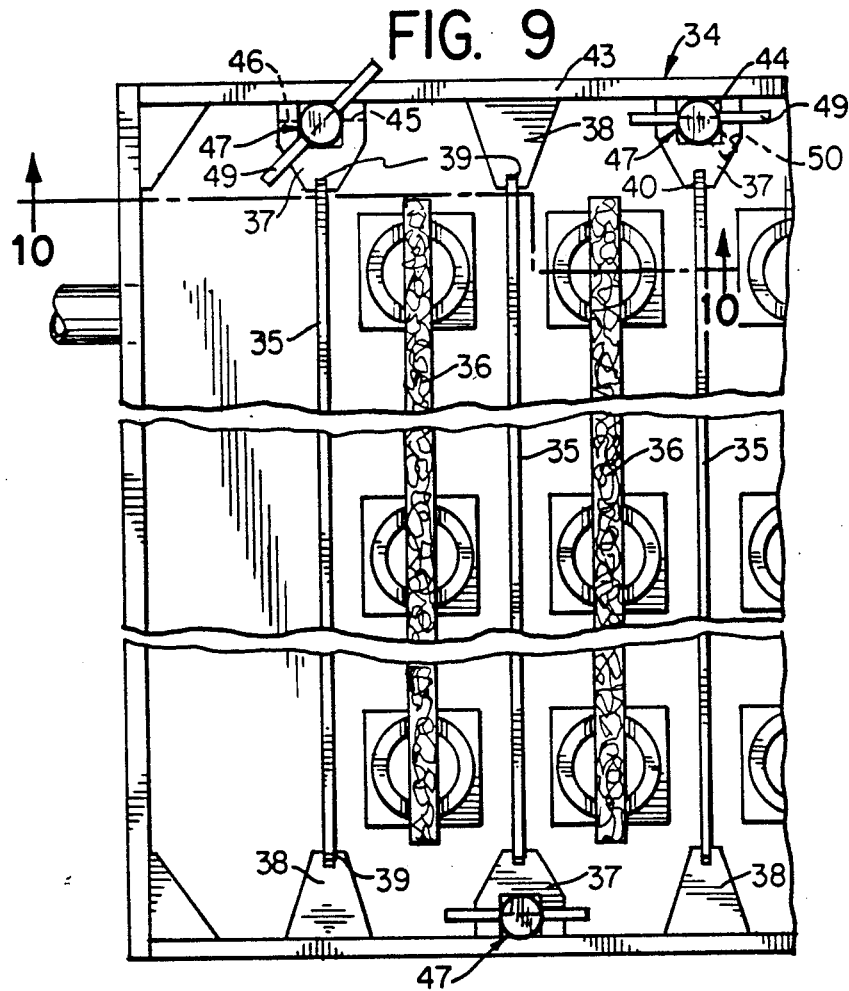
FIG. 9
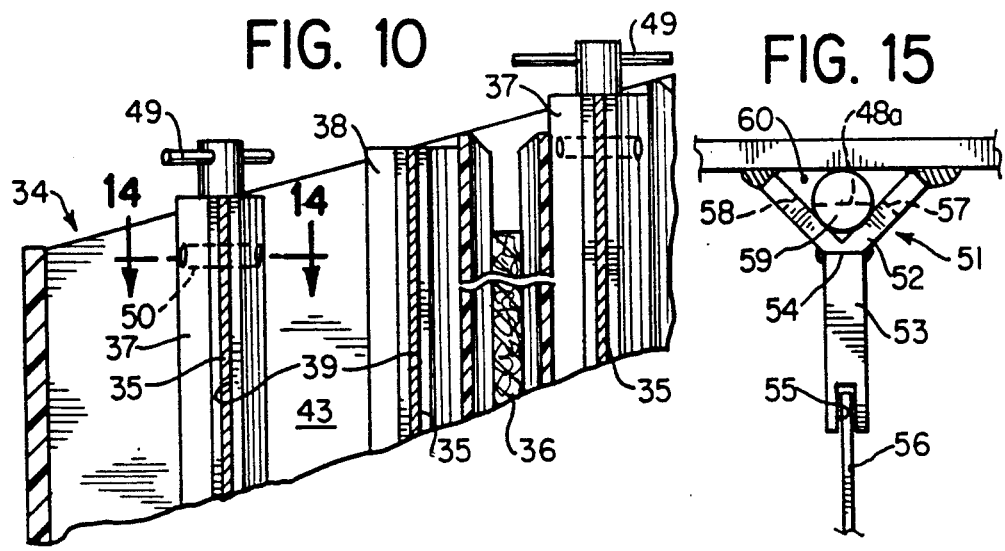
FIG. 10
FIG. 15

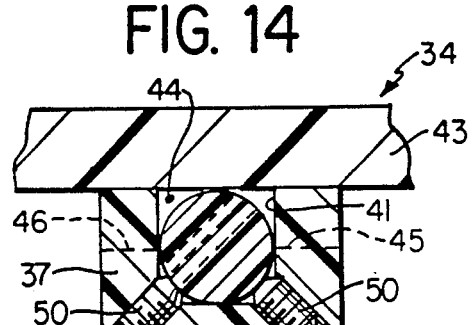
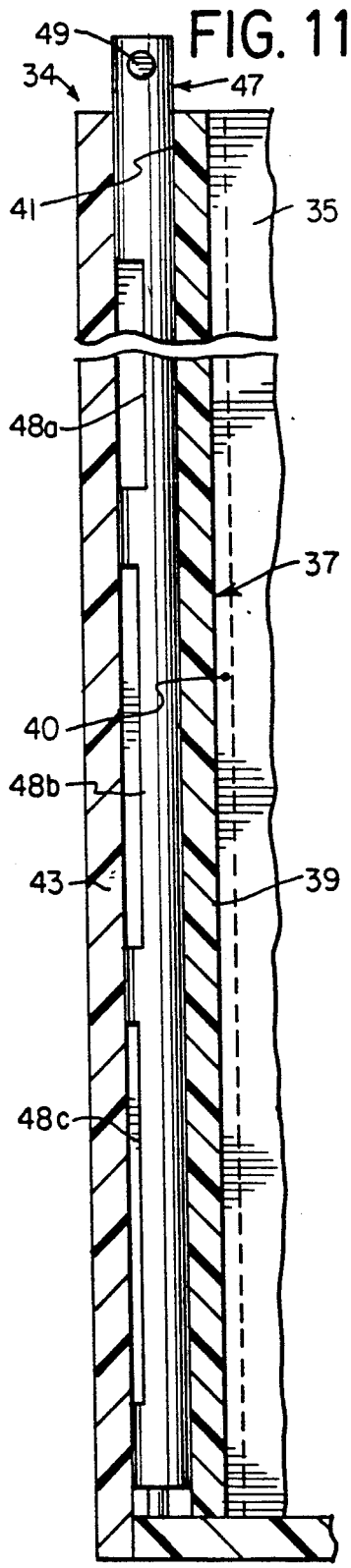
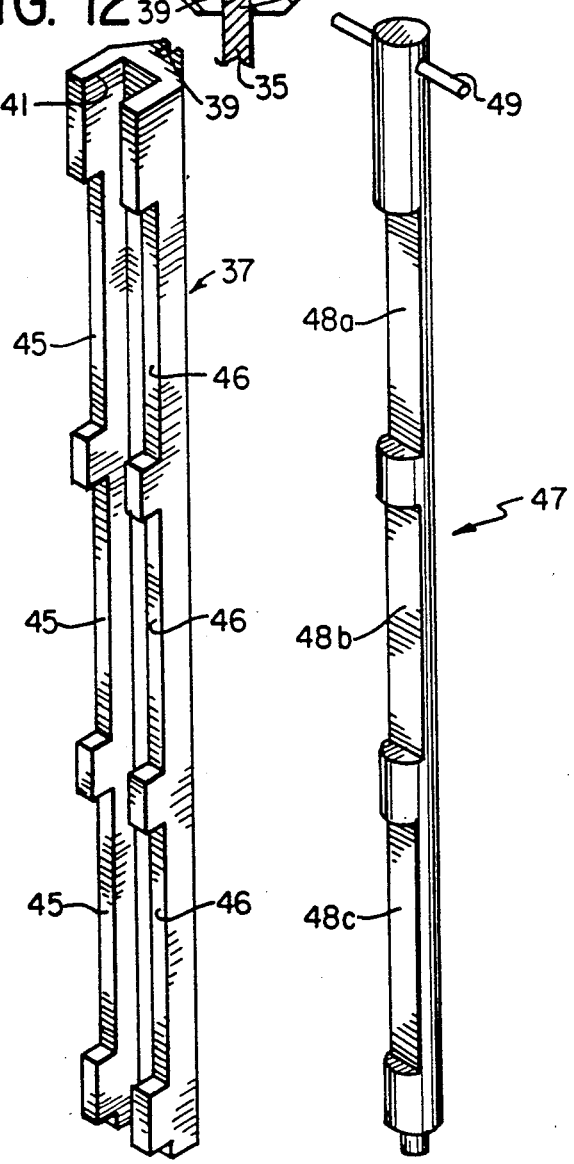

WASTE METAL EXTRACTION APPARATUS

This is a continuation in part of U.S. patent application Ser. No. 230,596, filed Aug. 10, 1988 now U.S. Pat. No. 4,863,580.

TECHNICAL FIELD

This invention relates to a method and apparatus for recovering metals from solution and more particularly to methods and apparatus for recovering metals from waste solutions which include solids dispersed therein.

BACKGROUND OF THE INVENTION

There are many applications where it is desirable to recover a metal from solution. For example, precious metals such as gold or silver which are incorporated in a plating or rinse solution may be removed for their intrinsic value.

Another application requiring removal of metals from solution are those where metal pollutants such as mercury, cadmium, copper, nickel, zinc, etc., hereinafter referred to as "heavy metals", must be removed in order to meet or exceed environmental standards. These pollutants typically are contained in waste streams from such industrial sources as metal finishing, metal plating or mining operations. Generally, even a small quantity of a heavy metal can render an otherwise innocuous waste into a hazardous waste, severely complicating disposal. While the removal of these contaminants is desirable from waste solutions, it is usually difficult to achieve separation of just the metals from the solution due to the presence of other waste contained within the stream. For example, the waste stream may include various solid contaminants dispersed therein.

One device for removing heavy metals from waste water is disclosed in U.S. Pat. No. 4,399,020 to Branchick, et al. The device disclosed includes a cell system which accommodates anodes and cathodes for electrolytically removing metals from solutions. Generally, the metal contaminant is plated on the cathode with the cathode then removed and the metal stripped therefrom. The device includes an essentially rectangular tank which includes alternatively solid anodes and cathodes possibly made of a reticulate metallized organic polymer foam. The anodes and cathodes are connectable to oppositely disposed anode and cathode bus bars, respectively. Essentially, a plurality of plates is disposed within the rectangular tank with the metal-containing stream entering at one end and exiting at the other end. An exemplary cell included approximately 41 anodes and was operated in the single-pass mode, relying on inlet filters to remove particulate before the fluid enters the tank. Branchick also requires holes in the reticulate cathodes to prevent overflow should the cathodes become plugged.

While useful in removing metals from solutions which are essentially clean, it has been found that the presence of solids within a waste stream could result in significant buildups of solid material within the tank which eventually reduces substantially the removal efficiency of the electrolytic cells. Utilizing filters prior to entry does not overcome the problem as the filters reduce flow, thereby similarly reducing removal efficiency. Also, some solids still may enter the tank, creating a build-up which eventually requires a system shutdown.

Another problem found with such devices is that utilizing conductive clamping strips wired to an adjacent buss bar, with the strips engaging the reticulate cathode above the liquid level for powering the cathode. Such strips produces an electrolytic gradient across the surface of the cathode producing uneven plating action and reduced efficiency.

Consequently, the search continues for an electrolytic cell capable of removing heavy metals from metal-containing solutions which also include solids dispersed therein.

SUMMARY OF THE INVENTION

It is an object of the present invention to provide a waste metal extraction apparatus which removes metal cations efficiently from solutions containing solid particles.

It is a further object of the present invention to provide a method for removing solids from the waste metal extraction apparatus during operation.

It is a further object of the present invention to maintain a high metal removal efficiency during operation, regardless of the presence of solids.

It is a further object of the present invention to provide means for producing uniform electrolytic action across the surface of a cathode, thereby improving metal removal efficiency across the entire surface area.

It is yet another object of the present invention to provide an improved cathode support system for ease in cathode removal.

It is yet another object of the present invention to provide flow control means at alternate anode supports to optimize flow and contact of the fluid with the cathodes in the tank.

According to the present invention, a waste metal extraction apparatus comprises a tank, the tank being downwardly sloped in the direction of flow by at least about 6 degrees, the tank further including a plurality of wall baffles along the sidewalls thereof, each baffle being disposed opposite an offset baffle, each baffle being essentially curved in order to maintain a high fluid velocity across the bottom of the tank, thereby preventing settlement of solids along the sidewalls thereof. The tank further includes alternating anodes and cathodes, with the anodes being essentially solid and the cathodes being essentially reticulate construction. A sludge gate is provided for withdrawing a portion of the waste solution passing therethrough, the portion containing the majority of any solids which may have settled out while traveling through the tank.

The extraction apparatus also includes means for distributing electrolytic power uniformly across the surface of the reticulate cathodes, the means comprising conductive forks extendable from the top of each cathode to the bottom thereof, at least one fork included per cathode, the forks connected to a cathode power source.

The waste metal extraction apparatus of the present invention further includes vertical support means disposable within sockets placed in the bottom of the tank. The support means comprise a plurality of posts, each post including a slot extending substantially the length of the post which is removably disposed in a mating socket in the tank bottom. Each slot is open at the top end thereof and includes means for attaching cathode locking means thereover.

In a preferred embodiment of the present invention, solid anodes are provided in alternating patterns to produce an essentially serpentine flow through the electrolytic cell with the curvaceous baffles being disposed in a facing relation to each anode, thereby promoting uniform flow velocity as the flow is changed from a first direction to a second direction within the tank.

Utilizing a sloped bottom with side-mounted baffles and a sludge gate allows any settable solids to be concentrated and withdrawn prior to interrupting or affecting the efficiency of metal removal within the cell. In addition, utilizing slotted posts eases both insertion and removal of the reticulate cathodes while providing a means for supporting the conductive forks which extend over the surface of the cathodes. Such a cell including means for directing the flow of waste material in a serpentine path within a tank on an incline allows metal-removing electrolytic cells to achieve higher metal removal efficiency over the course of a metal-removal operation when used with waste streams including solids dispersed therein.

In another embodiment of the present invention, the waste metal extraction apparatus includes a plurality of baffles along the sidewalls, each baffle being disposed opposite another baffle, with each pair of facing baffles being substantially triangularly shaped. Each facing baffle has means for retaining an end of an anode therein. With this embodiment, no space is provided at one end of the anode to allow flow thereby. Instead, at least one of the pair of baffles is a flow control baffle, having an axial chamber with inlet and outlet passages on opposite sides of the chamber. A flow control rod is disposed within the chamber, with the rod being rotatable and having slots which are alignable with the inlet and outlet passages such that the flow passes directly through the baffle. Thus, the flow velocity and amount can be adjusted from cathode to cathode by rotating the flow control rod, to account for variations in flow, for example, between relatively dirty and relatively clean cathodes.

BRIEF DESCRIPTION OF THE DRAWINGS

FIG. 2 is a top sectional view of the apparatus of the present invention.

FIG. 3 is a cross section of the apparatus, taken along the line 3—3 of FIG. 2.

FIG. 4 is an enlarged cross section of the apparatus, taken along the line 4—4 of FIG. 2.

FIG. 5 is an enlarged cross section of a support post including a cathode connector, taken along the line 5—5 of FIG. 4.

FIG. 6 is an enlarged top view of the post of FIG. 5.

FIG. 7 is a cross section of the post, taken along the line 7—7 of FIG. 5.

FIG. 8 is a cross section of a support post which does not include a cathode connector therein.

FIG. 9 is a plan view of an alternative embodiment of the waste metal extraction apparatus.

FIG. 10 is a view of a portion of the apparatus of FIG. 9, taken along the line 10—10 of FIG. 9.

FIG. 11 is an enlarged cross-sectional view of a flow control baffle and control rod.

FIG. 12 is a perspective view of a typical flow control baffle.

FIG. 13 is a perspective view of a typical control rod.

FIG. 14 is a cross-sectional view of the flow control baffle of FIG. 10.

FIG. 15 is a plan view of an alternative embodiment of a flow control baffle.

DETAILED DESCRIPTION OF THE INVENTION

Figure 1:
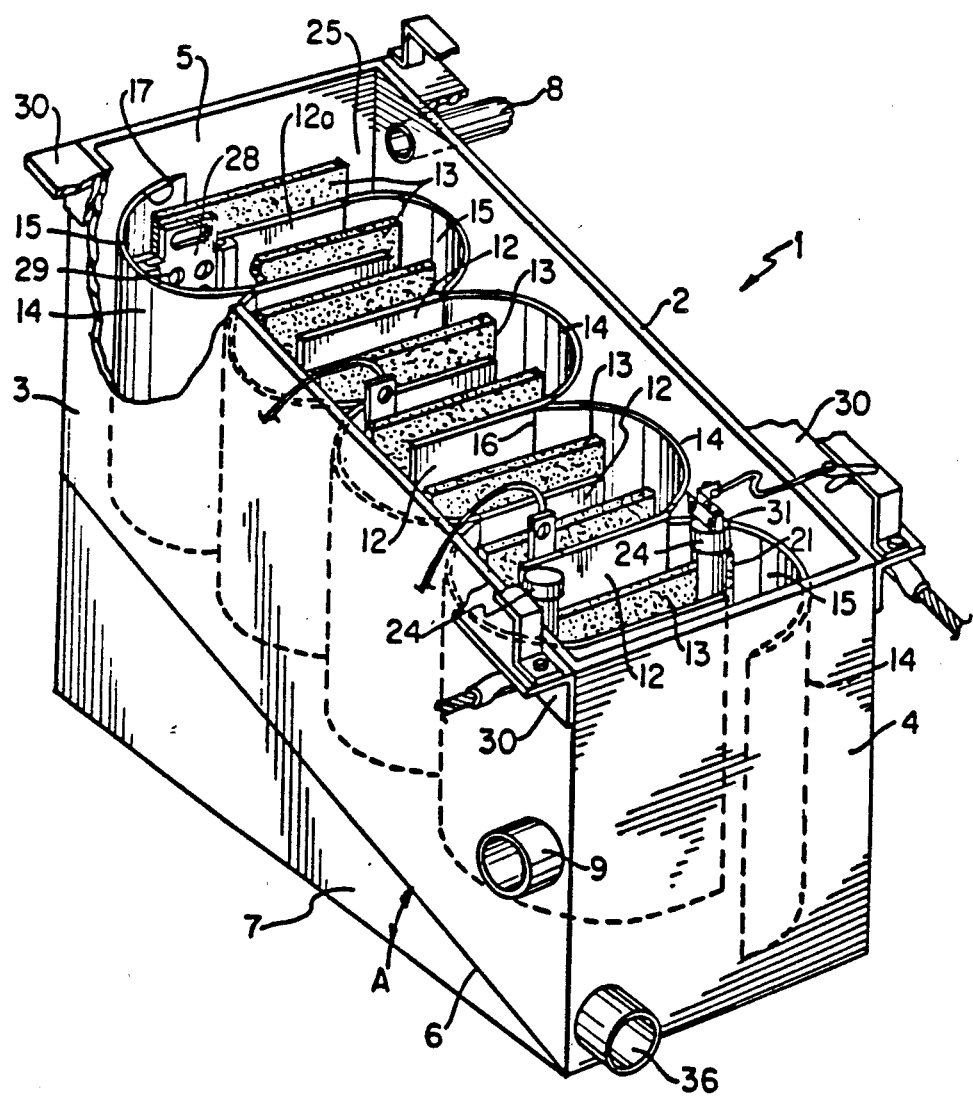
FIG. 1 is a perspective view of the waste metal extraction apparatus of the present invention, with portions broken away for clarity.

The apparatus hereinafter described is designed to electrolytically remove metals from a metal ion containing solution which has solids dispersed therein. Generally, a waste stream including metal ions and having from 1-15% solids may be used by the present invention. Such solutions may include various heavy metals, such as lead, mercury or cadmium, which will plate out on a cathode. The cathodes are then removed and either the metal recovered by placing the cathode in a metal dissolving solution, such as nitric acid or the cathode is simply disposed.

Referring to FIG. 1, an electrolytic cell tank 1, which can be made of various corrosion-resistant materials, such as polyethylene, polypropylene or other equivalent plastic material, includes two sides 2 and 3, a front 4, a back 5 and a bottom 6, with the cell tank being essentially rectangular in shape. The tank includes a support 7 which provides a downward slope of at least about 6 degrees from the back to front of the tank (see angle A), with about 6–30 degrees preferred. Inlet and outlet openings 8 and 9 are provided at the respective ends. The tank accommodates anodes 12 and cathodes 13 for electrolytically removing metals from a solution.

The sidewalls 2 and 3 are essentially flat but include a plurality of baffles 14 attached thereto. In one embodiment, each baffle comprises a partial cylindrical section. The baffles are placed end to end, with the baffles on one sidewall offset from the facing baffles on the other sidewall by about half a baffle (Best seen in FIG. 2). The baffle arrangement accommodates the flow pattern which will be further described below. Generally, each pair of facing baffles enclose at least one anode/cathode pair. The number of baffles is determined by the number of anode/cathode pairs believed required to effectuate the desired degree of metal removal.

Referring to FIGS. 2 and 3, the tank 1 houses a plurality of anodes 12 and cathodes 13 alternately placed therein. Each anode is essentially solid, and extends partially across the width of the tank. The solid anodes 12 may extend, for example, approximately 90% of the distance from one side of the tank to the other, leaving a gap 15 at the end thereof for passage of the waste stream. The anodes are retained in slots 16 in the baffles 14 and tank bottom 6. By alternating the gap from one side to the other, a serpentine flow path is provided, with the flow moving essentially parallel to the cathodes disposed in midstream between a pair of anodes. The anodes are placed in a particular relation to the baffles to promote a smooth transition as the flow changes direction. For example, the gap may face the curved baffle at a midsection 17, with the baffle ends 18 and 19 somewhat surrounding the anode. Utilizing partial cylindrical baffles with solid anodes provides uniform fluid velocities during redirection of the flow, thereby preventing a solids buildup at the tank sidewalls. In addition, the baffles keep the speed of solution sufficiently high to prevent isolated pockets of solution from avoiding contact with the metal removing cathodes.

As previously described, slots or other means may be provided in the tank sidewalls and bottom for allowing the slip fit of the solid anodes within the cell wall. Utilizing slots allows for ease of replacement should that be required. The tank further includes a flange along the outside periphery thereof with a flange on one side of the tank including a bus bar for connection with the anodes and oppositely dispose therefrom a bus bar for connection with the cathodes.

The anodes usable with the present invention are generally solid and composed of titanium or other metal substrate, with a precious metal and/or metal oxide coating of tantalum, iridium, rhodium, ruthenium, platinum, with or without nonprecious metal oxides such as manganese dioxide or lead dioxide included therein. The term "solid" refers to the prevention of flow through the anode, allowing for the use of conductive mesh incorporated on a support surface as the anode. Of course, any anode capable of producing an electrolytic removal of metal from a stream while directing the flow within the tank may be used.

The cathodes usable with the present invention are formed of any conductive material suitable for use in electrolytically removing a metal from solution. Preferably, the cathodes are formed from a cellular nonconductive base layer having a layer of conductive material attached thereto of sufficient thickness to render it operative for use in a waste metal recovery apparatus, examples of which are disclosed in U.S. Pat. No. 4,276,147 to Epner et al, which is hereby incorporated by reference.

Referring to FIG. 3, the tank bottom 6 follows a downward slope and includes means for retaining a plurality of cathode supports therein. Generally, such means comprise a plurality of sockets 20, each socket mateable with a support post 21 having a mating end 22 (not shown) for snugly fitting within the socket. Each support post includes a longitudinally extending slot 23 open at the top end thereof, and includes locking means for securely holding cathodes within the slots, such as a cap 24. Generally, the number of support posts is determined by the size and number of cathodes required. For example, in a tank having a width of approximately two feet, about two slotted support posts are required for maintaining a single reticulate cathode therein.

The flow through the tank may be adjusted by various flow control means. In a preferred embodiment, shown in FIG. 2, an inlet stream enters a flow distribution section 25 of the tank, with one anode 12a including an end portion 26. Referring to FIG. 4, the end portion in shown having a plurality of holes 27 distributed thereover. A vertically movable plate 28, which includes holes 29 distributed thereover in a matching pattern, is placed against the holed end portion 26. By moving the plate vertically, the open area provided by the holes may be reduced to adjust the fluid flow passing therethrough. Such a flow control system has the advantage of preventing channeling of the flow through the tank, with the holes evenly distributing the flow across the entire open area.

In order to assure optimum electrical contact of the cathode with a cathode bus bar 30, a plurality of conductive metal forks 31 having a length approximating the length of the cathode are placed over each cathode 12. Referring to FIGS. 5, 6 and 7, the fork 31 includes legs 32 which are somewhat biased towards each other to assure firm, continuous contact with the cathode over the entire length thereof. An upper end 33 of the fork includes means for connecting to the side-mounted cathode bus bar 30, with the means usually comprising a clamp for retaining the legs, the clamp including a lug extending therefrom. A wire 34, attached to the lug, includes a clip 35 at an end thereof for providing ease of disconnection from the bus bar should the cathodes require replacement. However, it is also contemplated that a permanent connection be used between the forks and the bus bar, with the forks being easily pulled off the cathodes during removal. The forks may be made from any conductive metal compatible with the waste stream, such as steel, brass, copper or other alloys. For many applications, 316 stainless steel is durable and a good economic choice. The forks should also be compatible with a cleaning solution, such as nitric acid, which is used to remove accumulations of plated metal therefrom.

Referring again to FIG. 1, the cell tank also includes a sludge gate 36 at the end of the serpentine flow pattern, determined by the baffle arrangement. The sludge gate comprises a valved outlet which may either continuously or periodically open to remove the built up solids which settle during the course of metal removable. These solids are continually flushed to the sludge gate position by the uniform flow velocity provided along the tank sidewall, further assisted by gravity which acts on the particles as they drift along the downwardly sloped bottom. In essence, the velocity is maintained at a sufficiently high level to assure that the solids continuously move to the sludge gate area. Without such baffling, solids would buildup along the tank wall and bottom, eventually requiring a shutdown and tank clean-out.

Referring to FIG. 9, an alternative embodiment of the present invention is shown where the anodes extend across the width of the tank. A tank 34 has anodes 35 and cathodes 36, with the cathodes supported as previously described. The anode 35 is held in place by a pair of baffles 37 and 38. A plurality of baffles are placed along both sides of the tank in a facing relationship. Each baffle has a slot 39 for receiving an end 40 of an anode. The baffles are preferably substantially triangularly shaped to optimize the flow pattern through the tank, limiting low velocity areas where solids could accumulate. Of course, other shapes could be used.

Of the pair of baffles, one is a flow control baffle 37, and one is a no-flow baffle 38. The flow control baffles alternate with no-flow baffles along each sidewall, thus providing the serpentine flow path, yet with an added degree of flow control by individual cathodes.

Referring to FIG. 11, a cross section of the flow control baffle 37 is shown. The baffles 37 are attached to a sidewall 43 and have a single elongated channel 41 which forms an axial chamber 44, extending the length thereof. Inlet passages 45 and outlet passages 46 are formed in each baffle 37 on the upstream and downstream sides of the baffle respectively. As shown in FIG. 12, three rectangular passages are provided on the upstream side of each baffle, in alignment with three rectangular passages on the downstream side, with the passages leading into and out of the chamber 44. However, any shape or size passages may be used, consistent with the desired flow conditions.

Referring again to FIG. 11, a rotatable flow control rod 47 is disposed within the chamber 44, with the rod being essentially cylindrical. Three slots 48a, 48b, and 48c are provided in a portion of the rod, the slots being vertically alignable with the inlet and outlet passages.

Referring to FIG. 13, the rod 47 has three slots 48a, 48b, and 48c, with each slot being graduated, i.e., varying in open cross section to adjust the flow from the top to the bottom of the tank. The rod 47 has a handle 49 which allows turning the rod to misalign the slots with the inlet and outlet passages and thus to reduce the flow. When the slots are fully aligned with the inlet and outlet passages, maximum flow through the baffle is achieved. A half turn of the rod would completely close off the passages and stop the flow through the baffle.

Referring to FIG. 14, a pair of set screws 50 are used to lock the control rod at a particular position once the desired flow rate has been achieved. Of course, other means may be used to lock the control device if desired. The handle 49 may also be replaced by a pneumatic or electric actuator which is variably controllable in response to a control signal from, for example, either a level or flow control device, thus providing continuous flow adjustment through the tank in response to changing conditions. Of course, the adaption of such conventional actuators to the flow control rods is well within the skill of those practicing in the art.

Referring to FIG. 15, an alternative embodiment of the baffles of the present invention is shown. A flow control baffle 51 has a triangular base portion 12, formed, for example, by welding a 1½"×1½"×¼" angle to the tank sidewall. Preferably, the angle is of a material compatible with the waste stream, such as polypropylene, polyethylene, or PVC. Generally, the angle material is identical to the tank material of construction. An extension portion 53 is welded to the apex of the triangle at 54. This extension portion includes a slot 55 for accepting an end of an anode 56 therein. The baffle 51 has passages 57 and 58 respectively, similar to the previous embodiment, with a similarly designed flow control rod 19 placed within a chamber 60 in the base portion. Where a no-flow baffle is needed, no passages are provided in the angle.

While the modified baffles have been shown in relation to the substantially triangular baffles, other shaped baffles could also include such a flow control rod disposed within the baffle cross-section, and the triangular shape represents only a preferred embodiment.

While alternating flow control baffles are shown and preferred, it is contemplated that all the baffles may be flow control baffles and that the no-flow baffles will simply have the control rod turned to the no-flow position. Thus, if desired, the direction of the flow path through the tank could be reversed, after a set time, to maximize contact with the cathodes, while minimizing solids settling in the tank.

Utilizing the flow control baffles allows varying the flow in response to dynamic conditions within a tank, thus further increasing the efficiency of the waste metal extraction apparatus for removing metals from a waste stream.

Utilizing a downwardly sloped tank and side-mounted baffles oppositely disposed produces high-efficiency metal extraction from waste streams which include solids dispersed therein. In addition, utilizing extended fork cathode connectors further increases efficiency of removal by producing uniform electrolytic contact across the surface of the cathode. Providing a sludge gate at the end of the baffled flow stream substantially reduces the buildup of solids within the cell allowing a concentrated stream to be removed for solids removal before returning the fluid to the tank. Generally, utilizing the modifications of the present invention provides heavy metal removal from substantially tougher waste streams than could be achieved with prior art electrolytic cells.

While the waste metal extraction apparatus of the present invention has been shown and described in relation to a rectangular tank including reticulate cathodes and essentially solid metal anodes disposed therein, it will be understood by those skilled in the art that changes or modifications could be made without varying from the scope of the present invention.

I claim:

1. A waste metal extraction apparatus including a cell tank having a bottom, at least two sidewalls, an inlet wall and an outlet wall, a plurality of alternating cathodes and anodes locatable therein for electrolytically removing a metal from a waste stream passing therethrough, the apparatus further comprising:

a plurality of baffles disposed on the tank sidewalls, the baffles on one sidewall oppositely disposed from the baffles on the other sidewall, at least half the baffles being flow control baffles, each flow control baffle having upstreat inlet passages and downstream outlet passages and having means for adjusting the flow of the waste stream passing through the baffle, the flow control baffles being disposed opposite and adjacent baffles through which no flow is allowed, such that the waste stream passing through the flow control baffles is guided through the tank in an essentially serpentine flow path.

2. The apparatus of claim 1 wherein each baffle has a slot for accepting an end of an anode therein.

3. A waste metal extraction apparatus including a cell tank having a bottom, at least two sidewalls, an inlet wall and an outlet wall, a plurality of alternating cathodes and anodes locatable therein for electrolytically removing a metal from a waste stream passing therethrough, the apparatus further comprising:

a plurality of baffles disposed on the tank sidewalls, the baffles on one sidewall oppositely disposed from the baffles on the other sidewall, at least half the baffles being flow control baffles, having means for adjusting the flow of the waste stream passing through the baffle, the flow control baffles being disposed opposite and adjacent baffles through which no flow is allowed, such that the waste streat is guided through the tank in an essentially serpentine flow path, each flow control baffles including inlet an outlet passages, and an axially disposed chamber, a rotatable flow control rod disposed within the chamber and having one or more slots which are alignable with the inlet and outlet passages for adjusting the flow therethrough.

4. The apparatus of claim 3, wherein the rod includes a plurality of graduated slots, each slot being of a different size from the other slots in order to vary the flow from the top to the bottom of the tank.

5. The apparatus of claim 3, wherein each rod further comprises a handle for manual adjustment, and, locking means for locking the rod in a particular position.

6. The apparatus of claim 5 wherein the locking means comprise set screws.

7. The apparatus of claim 3, wherein each rod is coupled to a pneumatic, electric or hydraulic actuator which rotates the rod in response to a control signal.

8. The apparatus of claim 3 wherein each baffle is substantially triangularly shaped.

9. The apparatus of claim 3 wherein all the baffles are flow control baffles, with at least half the baffles adjusted to prevent flow therethrough.

* * * * *